Sept. 26, 1967  S. H. WILK  3,344,229

CASING SEAL FOR BUS BARS

Filed Nov. 10, 1966

INVENTOR:
STANLEY H. WILK,
BY
ATTORNEY

United States Patent Office 3,344,229
Patented Sept. 26, 1967

3,344,229
CASING SEAL FOR BUS BARS
Stanley H. Wilk, Pittsfield, Mass., assignor to General Electric Company, a corporation of New York
Filed Nov. 10, 1966, Ser. No. 593,508
5 Claims. (Cl. 174—151)

ABSTRACT OF THE DISCLOSURE

In an enclosed electric power apparatus of the fluid-filled type, a plurality of parallel electric bus bars passing through the enclosure wall are sealed to the wall by an improved wedging structure which applies sealing pressure individually to each bar.

Figure 1:
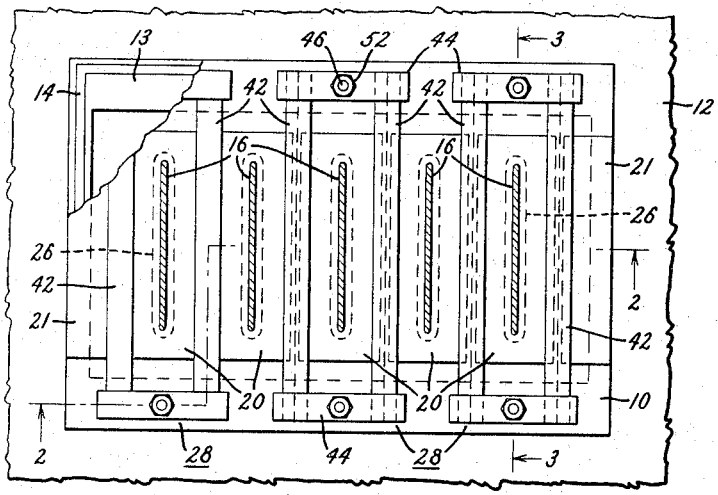

My invention generally relates to electric apparatus and to means for providing a fluid-tight seal for bus conductors passing through an apparatus casing, and has particular application to sealing a plurality of closely spaced rectangular electric bus conductors as they pass through the wall of a gas or oil-filled casing for electric apparatus such as a transformer.

In high current electrical apparatus, such as furnace transformers and the like, it is often desirable to bring flat copper bars out of the interior of the apparatus through a wall of the housing and to seal the bars to the wall to provide a fluid-tight casing for the apparatus. In the past, relatively narrow bar type leads with a relatively wide spacing have been sealed by passing the bars through a pair of insulating plates with an O-ring seal disposed about each bar and fitted into a groove in one of the insulating plates. However, that structure is not sufficient to effectively seal wide arrays of bars that are very closely spaced. As current capacity and spatial limitations frequently require the use of numerous and closely spaced bars, improved support and sealing structure is required.

In one alternative, the flat bars were attached to round studs within the apparatus, the studs gasketed and then passed through the cover of the transformer so as to provide conduction to the exterior of the transformer. Such structure is bulky and expensive. Bar type leads have also been molded into plastic panels, but this requires costly and troublesome bolted electrical joints within the apparatus which make for difficult installation or removal of the structure.

Accordingly, it is an object of this invention to provide an improved rigid and compact casing seal or bushing particularly useful for large arrays of closely spaced electrical bus bars which pass through an apparatus housing wall.

In carrying out my invention in one preferred embodiment, an array of parallel electric bus bars is passed out through corresponding slots in an insulating panel in side-by-side relation and a clamping ring or gland surrounds each bar contiguous to the outer surface of the panel. A sealing ring or gasket surrounds each bar between the panel and associated gland and is positioned in a peripheral notch in the gland. The gasket is compressed against the bar by an adjustable upper clamp which bears upon the gland. The upper clamp has tapered support legs which fit in wedging relation into notches formed by beveled edges of adjacent glands so as to provide both a vertical and lateral force on the glands. Intermediate vertical support for the insulating panel or plate itself is supplied by corresponding and preferably mating lower clamps on the interior surface of the plate.

Figure 2:
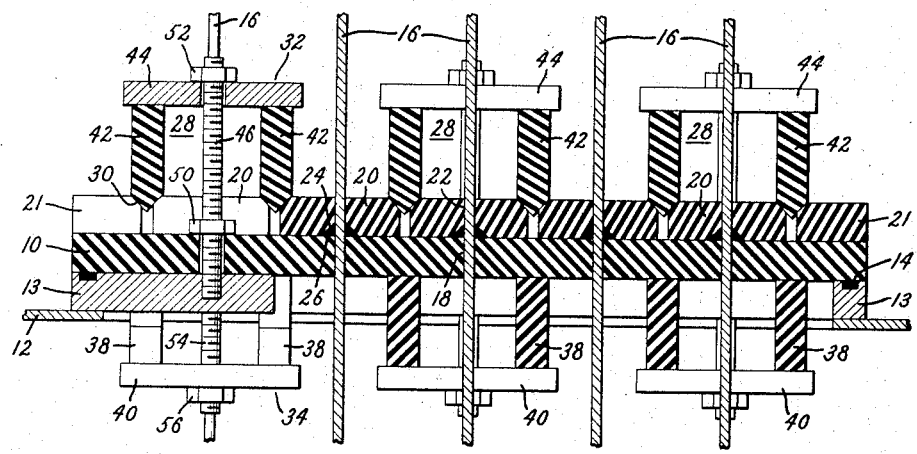
Figure 3:
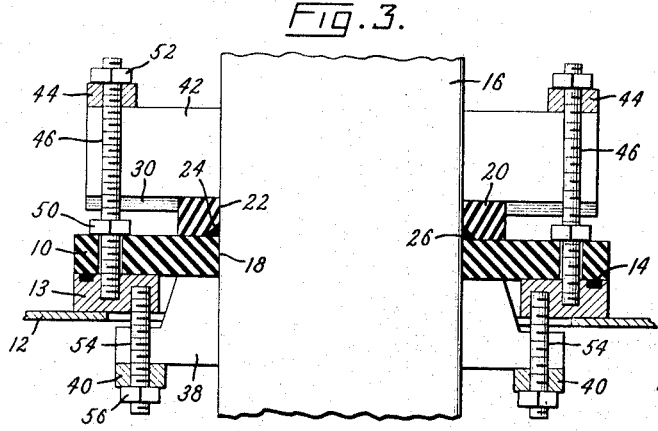

The specification concludes with claims particularly pointing out and distinctly claiming the subject matter which I regard as my invention. An illustrative embodiment of my invention is described in detail in the following description taken in conjunction with the accompanying drawings in which:

FIG. 1 is a plan view of a portion of a transformer;
FIG. 2 is a sectional view of the apparatus of FIG. 1 along the line 2—2; and
FIG. 3 is a sectional view of the apparatus of FIG. 1 along the line 3—3.

Referring now to FIGS. 1 and 2, an apertured apparatus housing wall 12 having a circumferential flange or lip 13 is closed by a plate or panel 10 of insulating material and sealed to the panel by a ring gasket 14 set into the flange. A plurality of flat rectangular bus bars 16 extend transversely through the panel 10 in parallel side-by-side relation and through corresponding apertures 18 in the panel. The bars 16 are preferably of flat relatively thin rectangular cross section with rounded edges. A plurality of rectangular glands 20 and end abutments 21 are positioned on top of the plate 10. Each of the bars 16 is surrounded by one rectangular gland 20 having a slot 22 through which the associated bar 16 passes. Each gland 20 is beveled at its lower face around the periphery of the slot 22 to form a gasket seat 24 adjacent the associated bar 16. An O-ring type sealing ring 26 surrounds each bar 16 and lies in the beveled seat 24. The seal thickness is somewhat larger than the width of the notch 24 so that the seal 26 may be compressed against the bar 16 to provide a fluid-tight seal therefor.

The parallel top edges of adjacent glands 20 and one edge of each end abutment 21 are beveled and arranged in juxtaposition to form V-shaped notches 30. The glands 20 are slidable upon the outer surface of the panel 10, but the abutments 21 are fixedly attached to the panel or otherwise held against outward sliding movement.

A clamping structure, generally shown at 28 (FIG. 2), is positioned about the alternate bus conductors 16. Each clamping structure 28 is comprised of an upper and a lower adjustable clamp 32 and 34, respectively.

The upper adjustable clamps 32 are used to provide a wedging force on the beveled surfaces of each pair of adjacent glands 20. This wedging action provides lateral support for the glands 20 and compresses the several O-ring seals 26 in sealing relation against the associated bar 16. The oblique clamping force can be considered to be resolved into vertical and lateral forces. Each upper clamp 32 consists of a plurality of wedge members 42 made of insulating material and two transverse clamping bars 44. The wedging members 42 are tapered at their bottom ends so each may fit within one of the V-shaped notches 30 between a pair of adjacent glands 20.

As shown in FIG. 3, each of the upper clamping bars 44 has a threaded stud 46 extending therethrough. Each of the studs 46 then passes through the insulating panel 10 and into a tapped hole in the metal flange member 13. The metal flange member is rigidly attached to the housing wall 12. Each of the studs 46 has a nut 50 engaging the top of the panel 10 to hold the panel 10 against the gasket 14 in sealed relation with the wall 12. A nut 52 is also provided on each of the studs 46 to engage the top of the upper clamping bar 44 so that an adjustment of the force acting through the wedging members 42 may be effected by turning the nut 52. The tapered portions of the wedging members 42 acting within the notches 30 thereby produce both vertical and lateral forces (resolved from a force oblique to the surface of the plate 10) acting on the glands 20 thereby to press the sealing rings 26 against the bars 16 in fluid-tight sealing relation and to provide lateral back-up support for each gland.

A lower adjustable clamp 34 is used to provide back-up support to the panel 10 beneath each upper clamp 32. Each lower clamp 34 is mounted below the panel 10 and consists of a pair of leg portions 38 extending from the bottom surface of the panel 10 to each of two cross bars 40. The lower clamp leg portions 38 are preferably located in mating alignment with the corresponding upper clamp wedging members 42 so that most of the force acting on the panel 10 due to the upper clamp 32 is transmitted directly to the lower clamp 34. Each of the lower clamp cross bars 40 has a threaded stud 54 extending therethrough and then into a tapped hole in the underside of the metal flange member 13. Each of the studs 54 has a nut 56 engaging the lower surface of the lower cross bar 40 so that adjustment of the force acting through the leg portions 38 may be effected by turning the nut 56.

It will be apparent to those skilled in the art that, if desired, each opposed pair of upper and lower cross bars 44 and 40 may be clamped together directly by means of a single through bolt passing through the insulating panel 10. In such case, of course, the bolt should be sealed, as by a compressible bushing, at the point where it passes through the panel.

It will now be evident that I have provided an improved clamp type sealing structure for a large array of parallel bus bars traversing a housing wall wherein separate positive clamping force is provided between each pair of bars and bending stress on the apertured wall is relieved by means of mating lower back-up members supporting the wall beneath each clamp. The seal and support structure therefore provides adequate support for wide, closely spaced conductors extending from the interior to the exterior of an electrical apparatus in addition to a fluid-tight seal for the conductors while allowing the support and seal structure to be easily removed from the transformer.

The particular support and seal structure as described above for use in electrical apparatus is merely illustrative and is subject to many modifications within the scope of the following claims:

What is claimed as new and desired to be secured by Letters Patent of the United States is:

1. In an electrical apparatus having a housing wall provided with an aperture, a slotted panel of insulating material closing said aperture, a plurality of flat bus bars extending through said slotted panel in closely spaced side-by-side parallel spaced relation, a separate elongated gland member surrounding each said bar adjacent one surface of said panel, each said gland member having at its lower surface adjacent said panel a beveled gasket seat surrounding the associated bus bar, and adjacent pairs of said gland members being tapered at their upper surfaces along juxtaposed parallel edges to form between said edges V-shaped notches, a circumferential compressible sealing ring in each said gasket seat, a wedging member positioned in each said V-shaped notch, and clamping means pressing said wedging members toward said panel to compress said sealing rings between said bus bars and said panel.

2. Apparatus according to claim 1 in which:
    (a) said wedging members are elongated and extend between and beyond each adjacent pair of said bus bars, and
    (b) said clamping means comprises separate pairs of cross bars extending across opposite ends of two said wedging members, each end of each said wedging member engaging only one cross bar.

3. Apparatus according to claim 2 in which said clamping means includes also an elongated back-up member engaging the opposite surface of said insulating panel in substantial alignment with each said wedging member and a plurality of pairs of cross bars extending across opposite ends of said back-up members in one-to-one opposing relation with cross bars engaging said wedging members.

4. Apparatus according to claim 1 in which said clamping means is disposed between said wedging members and the opposite surface of said insulating panel.

5. Apparatus according to claim 4 in which said clamping means includes a back-up member at said opposite surface of said insulating panel in substantial alignment with each said wedging member.

References Cited

UNITED STATES PATENTS

| | | | |
|---|---|---|---|
| 2,368,503 | 1/1945 | Unger | 174—18 X |
| 2,438,008 | 3/1948 | Hoop | 174—151 |
| 2,611,002 | 9/1952 | James | 174—152 X |
| 2,909,740 | 10/1959 | Seidel et al. | 174—151 X |

FOREIGN PATENTS 788,219   12/1957   Great Britain.

LARAMIE E. ASKIN, *Primary Examiner.*